(12) United States Patent
Cha

(10) Patent No.: US 10,643,792 B2
(45) Date of Patent: May 5, 2020

(54) MULTILAYER CAPACITOR

(71) Applicant: SAMSUNG ELECTRO-MECHANICS CO., LTD., Suwon-si, Gyeonggi-do (KR)

(72) Inventor: Berm Ha Cha, Suwon-si (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 35 days.

(21) Appl. No.: 15/981,685

(22) Filed: May 16, 2018

(65) Prior Publication Data

US 2019/0172643 A1   Jun. 6, 2019

(30) Foreign Application Priority Data

Dec. 1, 2017   (KR) .......................... 10-2017-0164290

(51) Int. Cl.
| | |
|---|---|
| *H01G 4/224* | (2006.01) |
| *H01G 4/012* | (2006.01) |
| *H01G 4/232* | (2006.01) |
| *H01G 4/30* | (2006.01) |
| *H01G 4/248* | (2006.01) |
| *H01G 4/008* | (2006.01) |
| *H01G 4/12* | (2006.01) |

(52) U.S. Cl.
CPC ........... *H01G 4/224* (2013.01); *H01G 4/0085* (2013.01); *H01G 4/012* (2013.01); *H01G 4/232* (2013.01); *H01G 4/248* (2013.01); *H01G 4/30* (2013.01); *H01G 4/1227* (2013.01); *H01G 4/1245* (2013.01)

(58) Field of Classification Search
CPC ...... H01G 4/248; H01G 4/012; H01G 4/1209; H01G 4/2325; H01G 4/30; H01G 4/224; H01G 4/0085; H01G 4/232; H01G 4/1227; H01G 4/1245
USPC ...................................................... 361/301.4
See application file for complete search history.

(56) References Cited

U.S. PATENT DOCUMENTS

| | | | | |
|---|---|---|---|---|
| 5,534,843 | A | * 7/1996 | Tsunoda | ................. H01C 1/034 338/22 R |
| 2012/0147516 | A1 | 6/2012 | Kim et al. | |
| 2016/0351335 | A1 | 12/2016 | Kato et al. | |

FOREIGN PATENT DOCUMENTS

| | | |
|---|---|---|
| KR | 10-1141457 B1 | 5/2012 |
| KR | 10-2016-0140449 A | 12/2016 |

* cited by examiner

*Primary Examiner* — Michael P McFadden
(74) *Attorney, Agent, or Firm* — Morgan, Lewis & Bockius LLP

(57) ABSTRACT

A multilayer capacitor includes a body including a plurality of first and second internal electrodes alternately disposed with respective to dielectric layers interposed therebetween and having first to sixth surfaces, the first internal electrode being exposed to the third, fifth, and sixth surfaces of the body, and the second internal electrode being exposed to the fourth, fifth, and sixth surfaces of the body; first and second side portions disposed on the fifth and sixth surfaces of the body, respectively, and including first and second metal layers disposed therein; and first and second external electrodes disposed on the third and fourth surfaces of the body, respectively, and connected to the first and second internal electrodes, respectively.

20 Claims, 8 Drawing Sheets

I-I'

MULTILAYER CAPACITOR

CROSS-REFERENCE TO RELATED APPLICATION

This application claims benefit of priority to Korean Patent Application No. 10-2017-0164290 filed on Dec. 1, 2017 in the Korean Intellectual Property Office, the disclosure of which is incorporated herein by reference in its entirety.

BACKGROUND

1. Field

The present disclosure relates to a multilayer capacitor.

2. Description of Related Art

A multilayer capacitor includes dielectric layers, internal electrodes disposed to face each other with respective to dielectric layers interposed therebetween, and external electrodes electrically connected to the internal electrodes.

Recently, in accordance with the miniaturization and multi-functionalization of electronic products, electronic components have also tended to be miniaturized and multi-functionalized. Along with the decrease in size of electronic components, the capacitance proportional to the size or area of overlap of the oppositely charged electrodes in the electronic components is also decreasing. Therefore, a high capacitance multilayer capacitor having a small size and high capacitance has been demanded.

In order to increase capacitance of the multilayer capacitor as described above, a method of thinning the dielectric layer, a method of highly stacking the thinned dielectric layer, and a method of improving an overlapping area or coverage of the internal electrode, or the like, have been considered.

Further, a method of increasing an area of overlap between internal electrodes forming capacitance has been considered.

In order to increase the area of overlap between the internal electrodes, a thickness of a margin portion may be relatively reduced, but when the thickness of the margin portion is excessively thin, structurally, there may be a problem in that moisture resistance reliability may be deteriorated. Therefore, in order to solve this problem, there is a need to increase a degree of densification of the margin portion.

SUMMARY

An aspect of the present disclosure may provide a multilayer capacitor capable of improving moisture resistance reliability by blocking a path through which moisture may infiltrate.

According to an aspect of the present disclosure, a multilayer capacitor may include a body including a plurality of dielectric layers and a plurality of first and second internal electrodes alternately disposed with respective to dielectric layers interposed therebetween and having first and second surfaces opposing each other, third and fourth surfaces connected to the first and second surfaces and opposing each other, and fifth and sixth surfaces connected to the first and second surfaces and the third and fourth surfaces and opposing each other, the first internal electrode being exposed to the third, fifth, and sixth surfaces of the body, and the second internal electrode being exposed to the fourth, fifth, and sixth surfaces of the body; first and second side portions disposed on the fifth and sixth surfaces of the body, respectively, and including first and second metal layers disposed therein; and first and second external electrodes disposed on the third and fourth surfaces of the body, respectively, and connected to the first and second internal electrodes, respectively.

The first and second metal layers may be formed of one or more metals having oxygen or moisture affinity, selected from the group consisting of Ni, W, Cu, and metal compounds.

The first and second metal layers may be formed of completely sintered densified layers.

The first and second metal layers may be in a partly sintered state in which a necking phenomenon is generated and un-sintered powder particles are dispersed in the body.

The first and second metal layers may be formed in a flat plate shape.

The first and second metal layers may include a plurality of stripe type patterns disposed to be spaced apart from each other in a stacking direction of the dielectric layers.

Each of the first and second metal layers may include a plurality of metal plates disposed to be spaced apart from each other in a thickness direction of the first and second side portions.

The first and second external electrodes may respectively include first and second connection portions disposed on the third and fourth surfaces of the body, respectively, and connected to the first and second internal electrodes, respectively, and first and second band portions extended from the first and second connection portions to portions of the first and second surfaces of the body, respectively.

The first and second side portions may be formed of ceramic slurry.

A height of the first and second metal layers in a stacking direction of the dielectric layers may be in a range of 90 to 98% of a height of the body.

A thickness of the first and second metal layers in a width direction of the dielectric layers may be in a range of 0.3 to 3 μm.

According to another aspect of the present disclosure, a multilayer capacitor comprising first and second side portions; a body between the first and second side portions, the body including dielectric layers and first and second internal electrodes alternately disposed with respective to dielectric layers interposed therebetween; and first and second external electrodes spaced apart from each other by the body and the first and second side portions. Each of the first and second side portions encloses a metal layer with high oxygen and moisture affinities.

According to another aspect of the present disclosure, a multilayer capacitor comprising first and second side portions; a body between the first and second side portions, the body including dielectric layers and first and second internal electrodes alternately disposed with respective to dielectric layers interposed therebetween; and first and second external electrodes spaced apart from each other by the body and the first and second side portions. Each of the first and second side portions encloses a plate-shaped metal layer and a strip-patterned metal layer.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, exemplary embodiments of the present disclosure will now be described in detail with reference to the accompanying drawings.

Figure 1:
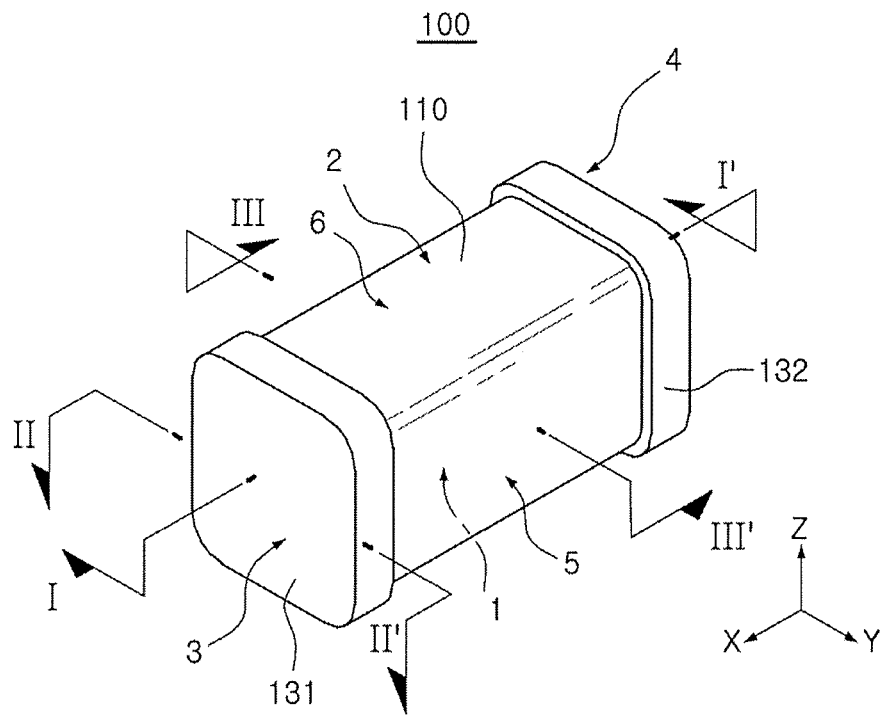
FIG. 1 is a schematic perspective view illustrating a multilayer capacitor according to an exemplary embodiment in the present disclosure.
Figure 2:
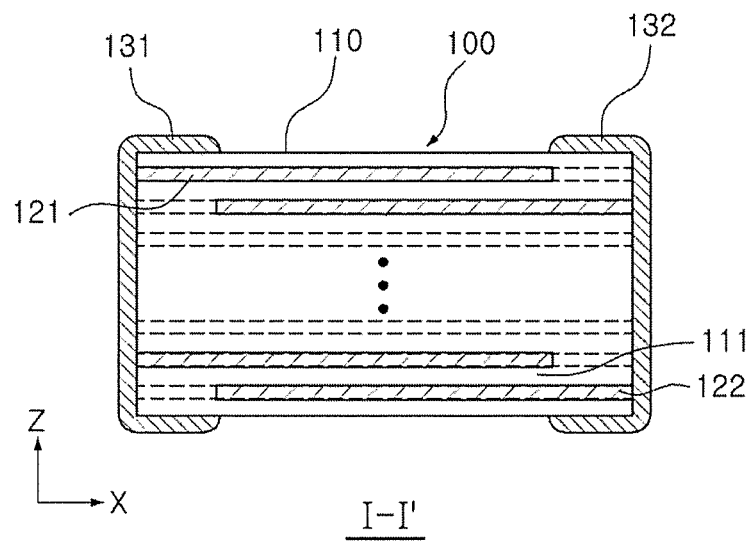
FIG. 2 is a cross-sectional view taken along line I-I' of FIG. 1 with the dotted line showing the layer structure of the dielectric layers and the boundary defined by the dotted line may disappear when the dielectric layers are integrated into one body.
Figure 3A:
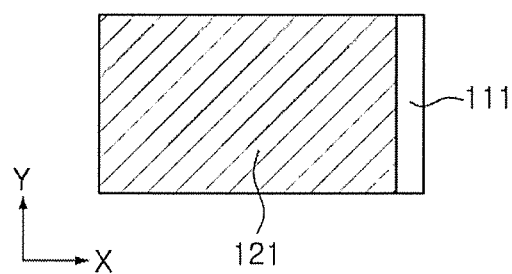
FIGS. 3A and 3B are plan views illustrating structures of first and second internal electrodes of the multilayer capacitor according to the exemplary embodiment in the present disclosure, respectively.
Figure 3B:
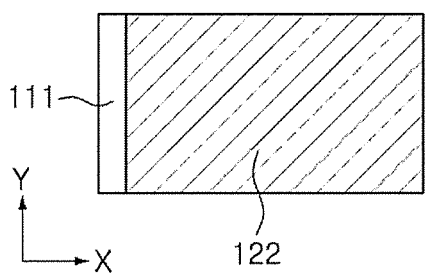
Figure 4:
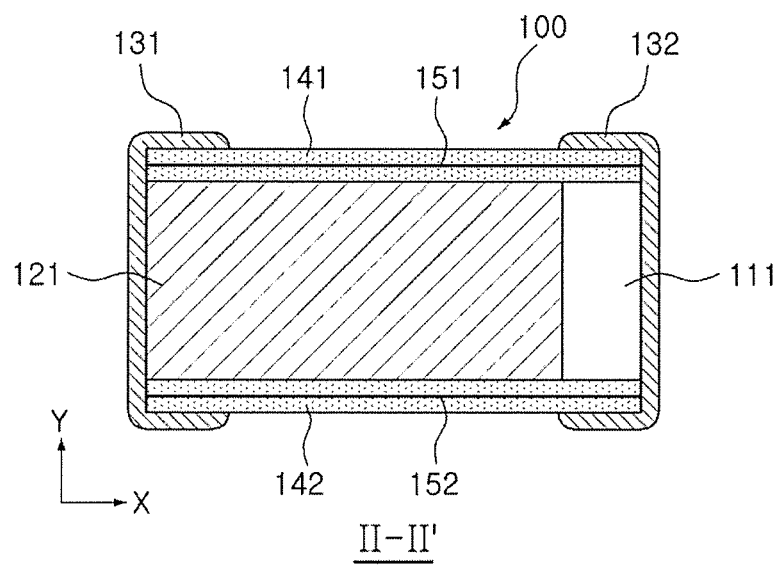
FIG. 4 is a cross-sectional view taken along line II-II' of FIG. 1.
Figure 5:
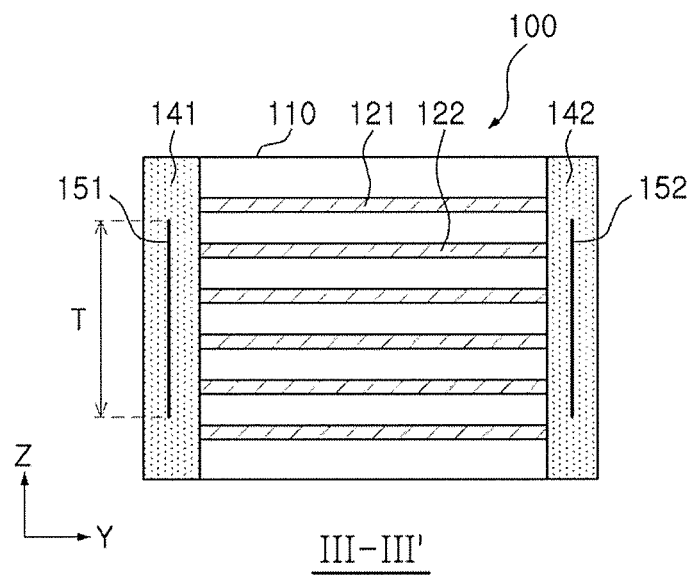
FIG. 5 is a cross-sectional view of an embodiment taken along line III-III' of FIG. 1.

FIG. 1 is a schematic perspective view illustrating a multilayer capacitor according to an exemplary embodiment in the present disclosure, FIG. 2 is a cross-sectional view taken along line I-I' of FIG. 1, FIGS. 3A and 3B are plan views illustrating first and second internal electrodes of the multilayer capacitor according to the exemplary embodiment in the present disclosure, respectively, FIG. 4 is a cross-sectional view taken along line II-II' of FIG. 1, and FIG. 5 is a cross-sectional view taken along line of FIG. 1.

Directions of a body 110 will be defined in order to clearly describe exemplary embodiments in the present disclosure. X, Y, and Z directions illustrated in the accompanying drawings refer to a length direction, a width direction, and a thickness direction of the body 110, respectively. Here, the thickness direction may be the same as a stacking direction in which dielectric layers 111 are stacked.

Referring to FIGS. 1 through 5, a multilayer capacitor 100 according to the present exemplary embodiment may include the body 110; first and second side portions 141 and 142 (FIGS. 4 and 5); and first and second external electrodes 131 and 132.

The body 110 may be formed by stacking a plurality of dielectric layers 111 in the Z direction and then sintering the stacked dielectric layers 111, and include the plurality of dielectric layers 111 and a plurality of first and second internal electrodes 121 and 122 alternately disposed in the Z direction with each of the dielectric layers 111 interposed therebetween.

In addition, if necessary, a cover having a predetermined thickness may be formed in both portions of the body 110 in the Z direction as a margin portion.

In this case, the respective adjacent dielectric layers 111 of the body 110 may be integrated with each other so that boundaries therebetween are not readily apparent.

The body 110 as described above may generally have a hexahedral shape. However, a shape of the body 110 is not limited thereto.

In the present exemplary embodiment, for convenience of explanation, both surfaces of the body 110 opposing each other in the Z direction will be defined as first and second surfaces 1 and 2, both surfaces of the body 110 connected to the first and second surfaces 1 and 2 and opposing each other in the X direction will be defined as third and fourth surfaces 3 and 4, and both surfaces of the body 110 connected to the first and second surfaces 1 and 2 and the third and fourth surfaces 3 and 4 and opposing each other in the Y direction will be defined as fifth and sixth surfaces 5 and 6. In the present exemplary embodiment, the first surface 1 corresponding to a lower surface may become a surface in a mounting direction.

In addition, the dielectric layer 111 may contain a ceramic material having high permittivity such as $BaTiO_3$ based ceramic powder, or the like. However, the material of the dielectric layer 111 is not limited thereto.

The $BaTiO_3$ based ceramic powder may be, for example, $(Ba_{1-x}Ca_x)TiO_3$, $Ba(Ti_{1-y}Ca_y)O_3$, $(Ba_{1-x}Ca_x)(Ti_{1-y}Zr_y)O_3$, or $Ba(Ti_{1-y}Zr_y)O_3$ in which Ca, Zr, and the like, are partially solid-dissolved in $BaTiO_3$, or the like, but an example of the $BaTiO_3$ based ceramic powder is not limited thereto.

Further, a ceramic additive, an organic solvent, a plasticizer, a binder, a dispersant, and the like, may be further added to the dielectric layer 111 together with the ceramic powder. As the ceramic additive, for example, a transition metal oxide or carbide, rare earth elements, magnesium (Mg), aluminum (Al), or the like, may be used.

The first and second internal electrodes 121 and 122 may be electrodes having different polarities from each other, wherein the first internal electrode 121 may be exposed to the third, fifth and sixth surfaces 3, 5, and 6 of the body 110, and the second internal electrode 122 may be exposed to the fourth, fifth and sixth surfaces 4, 5, and 6 of the body 110.

Here, the first and second internal electrodes 121 and 122 may be electrically insulated from each other by the dielectric layer 111 disposed therebetween.

The first and second external electrodes 131 and 132 may be disposed on the third and fourth surfaces of the body 110, respectively, and electrically connected to the first and second internal electrodes 121 and 122, respectively.

In this case, the first and second internal electrodes 121 and 122 may be formed of a conductive metal, for example, nickel (Ni), a nickel (Ni) alloy, or the like. However, a material of the first and second internal electrodes 121 and 122 is not limited thereto.

Through the above-mentioned configuration, when a predetermined voltage is applied to the first and second external electrodes 131 and 132, electric charges may be accumulated between the first and second internal electrodes 121 and 122 facing each other.

In this case, capacitance of the multilayer capacitor 100 may be in proportion to an area of overlap between the first and second internal electrodes 121 and 122 overlapping each other in the Z direction.

Voltages having different polarities may be provided to the first and second external electrodes 131 and 132, and the external electrodes 131 and 132 may be electrically connected to exposed portions of the first and second internal electrodes 121 and 122, respectively.

The first external electrode 131 may include a first connection portion disposed on the third surface 3 of the body 110 and connected to the first internal electrode 121, and a first band portion extended from the first connection portion to portions of the first and second surfaces 1 and 2 of the body 110.

Here, the first band portion may be further extended to portions of the fifth and sixth surfaces 5 and 6 of the body 110.

The second external electrode 132 may include a second connection portion disposed on the fourth surface 4 of the body 110 and connected to the second internal electrode 122, and a second band portion extended from the second connection portion to portions of the first and second surfaces 1 and 2 of the body 110.

Here, the second band portion may be further extended to portions of the fifth and sixth surfaces 5 and 6 of the body 110.

In addition, if necessary, plating layers may be formed on surfaces of the first and second external electrodes 131 and 132.

For example, the first and second external electrodes 131 and 132 may include first and second conductive layers, first and second nickel (Ni) plating layers formed on the first and second conductive layers, and first and second tin (Sn) plating layers formed on the first and second nickel (Ni) plating layers, respectively.

The first side portion 141 may be disposed on the fifth surface 5 of the body 110, and a first metal layer 151 may be disposed therein.

The second side portion 142 may be disposed on the sixth surface 6 of the body 110, and a second metal layer 152 may be disposed therein.

Further, the first and second side portions 141 and 142 may be formed of ceramic slurry, and a thickness of the first and second side portions 141 and 142 in the Y direction may be adjusted by adjusting an amount of the ceramic slurry.

The first and second side portions 141 and 142 as described above may serve to protect the body 110 and the first and second internal electrodes 121 and 122 from external impacts, or the like, and to secure insulation performance around the body 110 and moisture resistance reliability.

In the present exemplary embodiment, since the side portions are formed by a post-processing method after forming the body to expose both side surfaces of the internal electrodes, the internal electrodes may be formed to have a maximum area, such that capacitance may be increased, and the side portions may be formed to have a desired thickness, such that margins to be required may be easily secured.

The first and second metal layers 151 and 152 may serve to prevent moistures, or the like, infiltrated through the first and second side portions 141 and 142 or the first and second external electrodes 131 and 132 from reaching the internal electrodes.

That is, the metal layer disposed in the side portion may first react with the moisture infiltrated through the margin portion or the external electrode of the multilayer capacitor 100 to block the moisture from reaching the internal electrode of the body, such that moisture resistance reliability of a product may be improved.

The first and second metal layers 151 and 152 as described above may be formed of one or more metals having oxygen or moisture affinity, selected from the group consisting of Ni, W, Cu, and metal compounds.

Further, the first and second metal layers 151 and 152 may be formed of densified layers of which sintering is completed or be in a state in which a necking phenomenon is generated and un-sintered powder particles are dispersed. Due to this structure, a specific surface area may be increased, such that an effect of improving moisture resistance may be significantly increased In addition, the first and second metal layers 151 and 152 may have a length enough to make both end portions thereof in the X direction to be spaced apart from the first and second external electrodes 131 and 132.

Further, a height T of the first and second metal layers 151 and 152 in the Z direction corresponding to the stacking direction of the dielectric layers 111 may be in a range of 90 to 98% of a height of the body 110 in the Z direction.

In addition, a length of the first and second metal layers 151 and 152 in the X direction may be 100% of a length of the body 110 in the X direction so as to block infiltration of moisture infiltrated through interfaces between the external electrodes and the body.

Further, a thickness of the first and second metal layers 151 and 152 in the Y direction (not shown) may be in a range of 0.3 to 3 μm.

In the present exemplary embodiment, each of the first and second metal layers 151 and 152 may have a flat plate shape and be a single layer.

Figure 6:
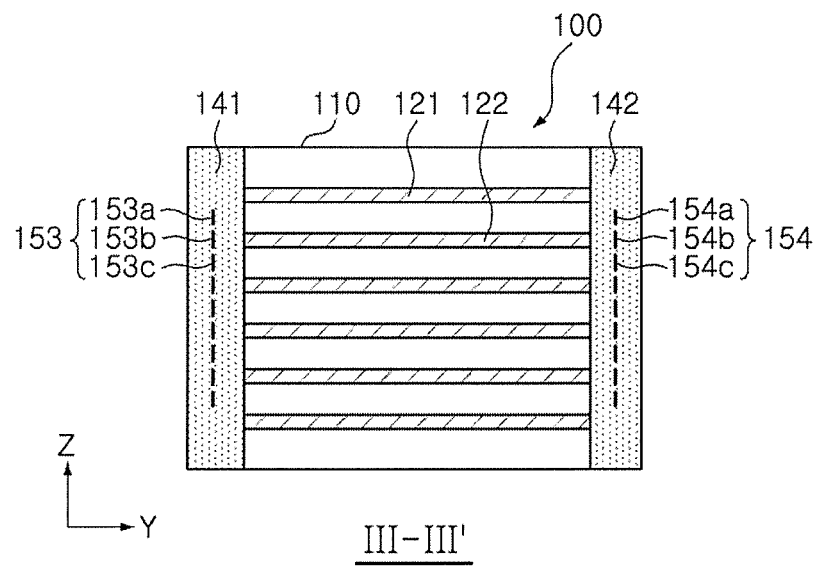
FIG. 6 is a cross-sectional view of another embodiment taken along line III-III' of FIG. 1.

However, the first and second metal layers 151 and 152 are not limited thereto, but as illustrated in FIG. 6, a first metal layer 153 may have a structure in which a plurality of stripe type patterns 153a, 153b, and 153c are disposed to be spaced apart from each other and with lengthwise directions of the stripe type patterns 153a, 153b, and 153c aligned in the Z direction corresponding to the stacking direction of the dielectric layers 111. Further, a second metal layer 154 may have a structure in which a plurality of stripe type patterns 154a, 154b, and 154c are disposed to be spaced apart from each other in the Z direction corresponding to the stacking direction of the dielectric layers 111.

Therefore, in a cross section of the body 110 in a Z-Y direction, the first and second metal layers 153 and 154 may be formed in a dotted line shape. When the first and second metal layers 153 and 154 include the plurality of stripe type patterns as described above, since a specific surface area of the metal layers coming in contact with the moisture is further increased as compared to a structure of the metal layer having the flat plate shape as described above, an effect of absorbing moisture infiltrated from the outside to improve reliability may be further improved.

Figure 8:
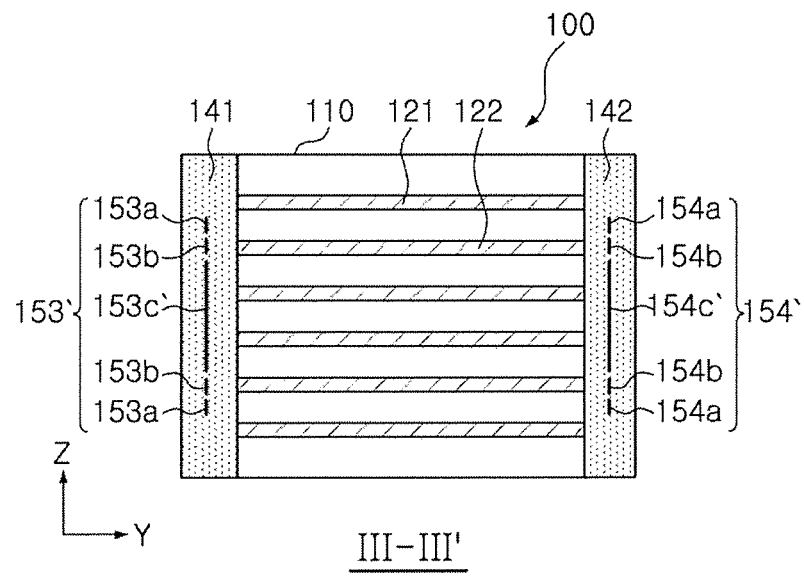

In some embodiments of the present disclosure, the stripe type patterns 153a, 153b, and 153c may have the same lengths along the Z direction and are spaced apart by gaps of same dimension. In other embodiments of the present disclosure, the stripe type patterns 153a, 153b, and 153c may have different lengths along the Z direction. FIG. 8 shows an embodiment having first and second metal layers 153' and 154', each having stripe type patterns 153a, 153b, and 153c' which has a length different from the stripe type patterns 153a and 153b. The length of the stripe type patterns 153a, 153b, and 153c is related to the desired moisture resistance properties of the multilayer capacitor 100. The plate-shaped metal layer 153c' may be positioned in the center, one edge or both edge, in the Z direction, of the first metal layer 153'. Similar situations are applied to the metal layers 154a, 154b, and 154c'.

Although FIG. 8 shows that the stripe type patterns 153a and 153b in FIG. 8 have the same length, in other embodiments the stripe type patterns 153a and 153b may have different lengths. Also, it may be difficult to observe from FIG. 8 that the thicknesses of each of the stripe type patterns 153a, 153b, and 153c may also be adjusted to be the same as or different from each other so as to achieve a desired moisture resistance of the multilayer capacitor 100 with different device architectures, for example, the thicknesses of the stripe type patterns 153a and 153b may be greater than the stripe type pattern 153c. In other embodiments of the present disclosure, the thickness of the stripe type pattern 153c may be greater than the stripe type patterns 153a and 153b.

Figure 7:
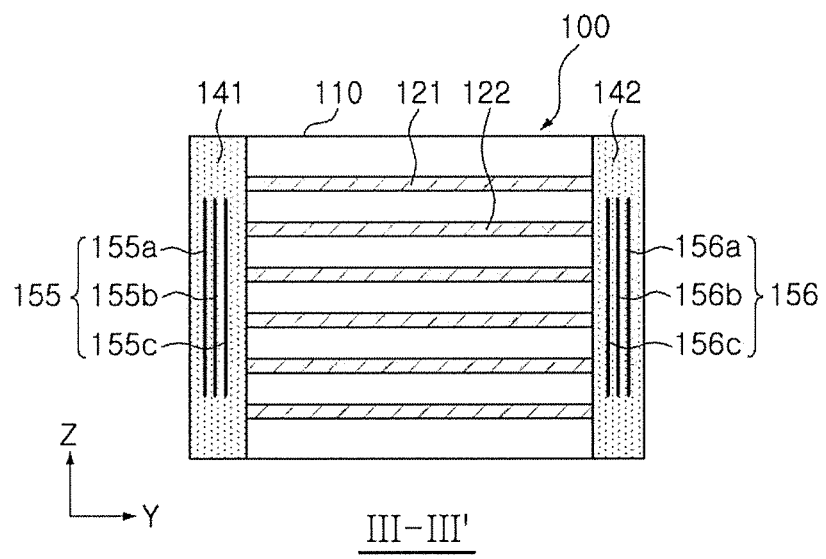
FIGS. 7 to 14 are cross-sectional views illustrating other examples of metal layers according to the present disclosure, taken along line III-III' of FIG. 1, respectively.

FIG. 7 shows that a first metal layer 155 may include a plurality of metal plates 155a, 155b, and 155c disposed to be spaced apart from each other in the Y direction corresponding to the thickness direction of the first side portion 141.

In addition, a second metal layer 156 may include a plurality of metal plates 156a, 156b, and 156c disposed to spaced apart from each other in the Y direction corresponding to the thickness direction of the second side portion 156.

Therefore, in a cross section of the body 110 in a Z-Y direction, each of the first and second metal layers 155 and 156 may have a multilayer structure in which the plurality of plate-shaped metal plates are stacked in the Y direction. When the metal layers have a multilayer structure as described above, infiltration of moisture may become more difficult, such that an effect of improving reliability of the multilayer capacitor may be further improved. In some embodiments of the present disclosure, the layers 155a, 155b, and 155c may be spaced apart from each other. In other embodiments of the present disclosure, the layers 155a, 155b, and 155c may contact each other. In other embodiments of the present disclosure, some layers among 155a, 155b, and 155c contact each other while others are spaced apart from each other. The same situations apply to the metal layers 156a, 156b, and 156c.

Meanwhile, when the metal layers have a multilayer structure as described above, respective layers may be formed of the same metal material as each other. Alternatively, if necessary, the layers may be partially formed of a different material, or all the layers may be formed of different materials from each other.

Figure 9:
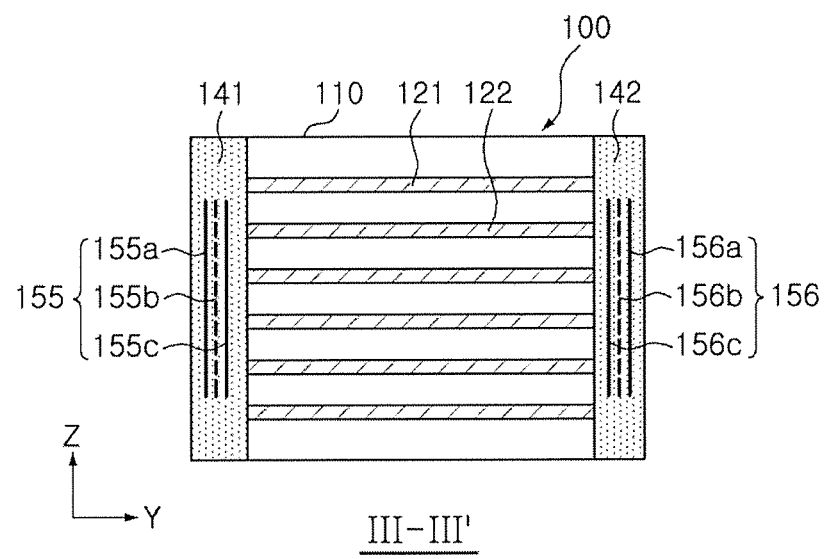

As illustrated in FIG. 9, a first metal layer 155 may include a plurality of metal plates, i.e. plate-shaped metal layer 155a, stripe-patterned metal layer 155b, and plate-shaped metal layer 155c disposed to be spaced apart from each other in the Y direction corresponding to the thickness direction of the first side portion 141.

In addition, a second metal layer 156 may include a plurality of metal plates, i.e. plate-shaped metal layer 156a, stripe-patterned metal layer 156b, and plate-shaped metal layer 156c disposed to be spaced apart from each other in the Y direction corresponding to the thickness direction of the second side portion 142.

Therefore, in a cross section of the body 110 in a Z-Y direction, each of the first and second metal layers 155 and 156 may have a multilayer structure in which the plurality of plate-shaped metal plates are stacked in the Y direction. When the metal layers have a multilayer structure as described above, infiltration of moisture may become more difficult, such that an effect of improving reliability of the multilayer capacitor may be further improved. In some embodiments of the present disclosure, the layers 155a, 155b, and 155c may be spaced apart from each other. In other embodiments of the present disclosure, the layers 155a, 155b, and 155c may contact each other. In other embodiments of the present disclosure, some layers among 155a, 155b, and 155c contact each other while others are spaced apart from each other. The same situations apply to the metal layers 156a, 156b, and 156c.

Meanwhile, when the metal layers have a multilayer structure as described above, respective layers may be formed of the same metal material as each other. Alternatively, if necessary, the layers may be partially formed of a different material, or all the layers may be formed of different materials from each other.

Figure 10:
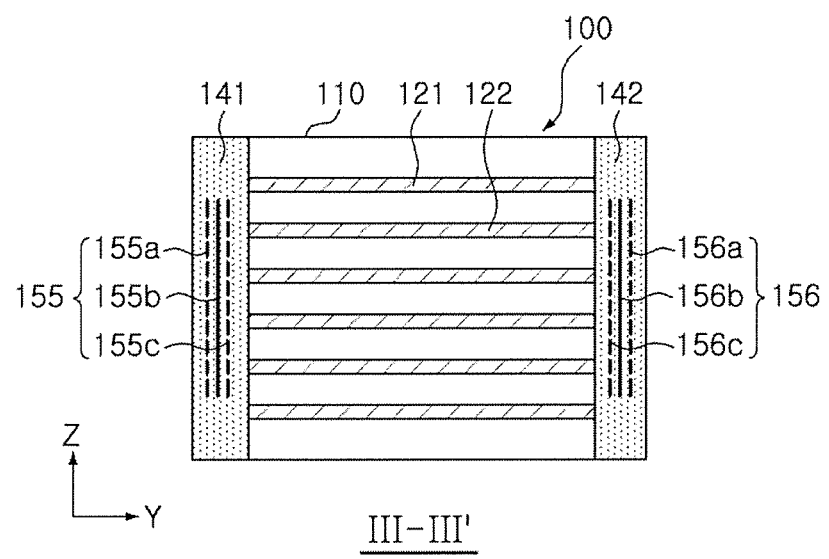

As illustrated in FIG. 10, a first metal layer 155 may include a plurality of metal plates, i.e. stripe-patterned metal layer 155a, plate-shaped metal layer 155b, and stripe-patterned metal layer 155c disposed to be spaced apart from each other in the Y direction corresponding to the thickness direction of the first side portion 141.

In addition, a second metal layer 156 may include a plurality of metal plates, i.e. stripe-patterned metal layer 156a, plate-shaped metal layer 156b, and stripe-patterned metal layer 156c disposed to be spaced apart from each other in the Y direction corresponding to the thickness direction of the second side portion 142.

Therefore, in a cross section of the body 110 in a Z-Y direction, each of the first and second metal layers 155 and 156 may have a multilayer structure in which the plurality of plate-shaped metal plates are stacked in the Y direction. When the metal layers have a multilayer structure as described above, infiltration of moisture may become more difficult, such that an effect of improving reliability of the multilayer capacitor may be further improved. In some embodiments of the present disclosure, the layers 155a, 155b, and 155c may be spaced apart from each other. In other embodiments of the present disclosure, the layers 155a, 155b, and 155c may contact each other. In other embodiments of the present disclosure, some layers among 155a, 155b, and 155c contact each other while others are spaced apart from each other. The same situations apply to the metal layers 156a, 156b, and 156c.

Meanwhile, when the metal layers have a multilayer structure as described above, respective layers may be formed of the same metal material as each other. Alternatively, if necessary, the layers may be partially formed of a different material, or all the layers may be formed of different materials from each other.

Figure 11:
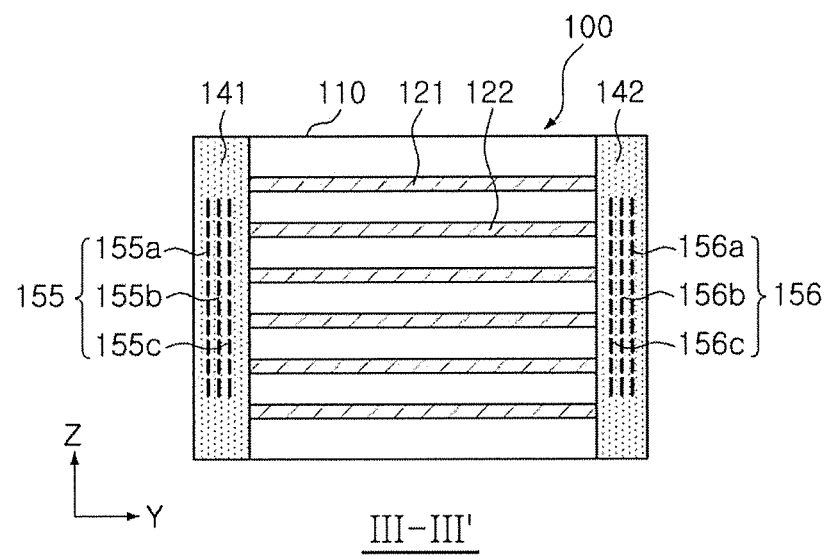

As illustrated in FIG. 11, a first metal layer 155 may include a plurality of metal plates, i.e. strip-patterned metal layers 155a, 155b, and 155c disposed to be spaced apart from each other in the Y direction corresponding to the thickness direction of the first side portion 141.

In addition, a second metal layer 156 may include a plurality of metal plates, i.e. stripe-patterned metal layers 156a, 156b, and 156c disposed to be spaced apart from each other in the Y direction corresponding to the thickness direction of the second side portion 142.

Therefore, in a cross section of the body 110 in a Z-Y direction, each of the first and second metal layers 155 and 156 may have a multilayer structure in which the plurality of plate-shaped metal plates are stacked in the Y direction. When the metal layers have a multilayer structure as described above, infiltration of moisture may become more difficult, such that an effect of improving reliability of the multilayer capacitor may be further improved. In some embodiments of the present disclosure, the layers 155a, 155b, and 155c may be spaced apart from each other. In other embodiments of the present disclosure, the layers 155a, 155b, and 155c may contact each other. In other embodiments of the present disclosure, some layers among 155a, 155b, and 155c contact each other while others are spaced apart from each other. The same situations apply to the metal layers 156a, 156b, and 156c.

Meanwhile, when the metal layers have a multilayer structure as described above, respective layers may be formed of the same metal material as each other. Alternatively, if necessary, the layers may be partially formed of a different material, or all the layers may be formed of different materials from each other.

Figure 12:
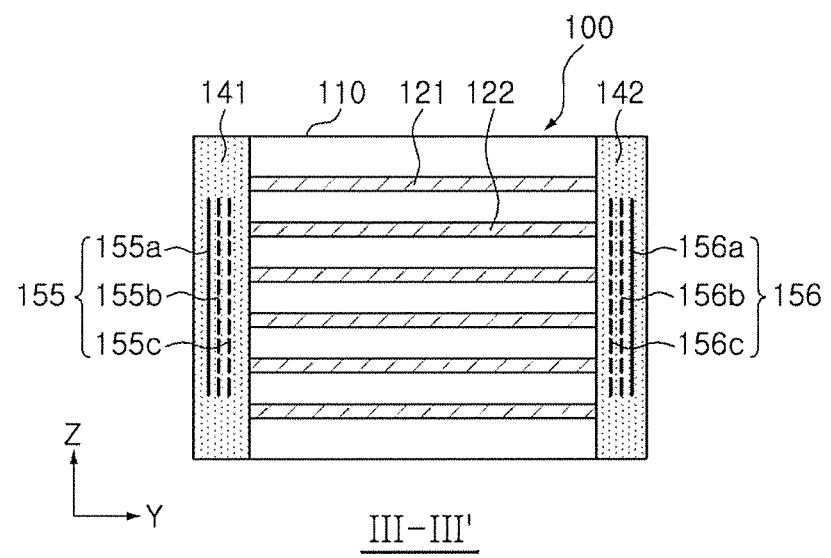

As illustrated in FIG. 12, a first metal layer 155 may include a plurality of metal plates, i.e. plate-shaped metal layer 155a and stripe-patterned metal layers 155b and 155c disposed to be spaced apart from each other in the Y direction corresponding to the thickness direction of the first side portion 141.

In addition, a second metal layer 156 may include a plurality of metal plates, i.e. plate-shaped metal layer 156a and stripe-patterned metal layers 156b and 156c disposed to be spaced apart from each other in the Y direction corresponding to the thickness direction of the second side portion 142.

Therefore, in a cross section of the body 110 in a Z-Y direction, each of the first and second metal layers 155 and 156 may have a multilayer structure in which the plurality of plate-shaped metal plates are stacked in the Y direction. When the metal layers have a multilayer structure as described above, infiltration of moisture may become more difficult, such that an effect of improving reliability of the multilayer capacitor may be further improved. In some embodiments of the present disclosure, the layers 155a, 155b, and 155c may be spaced apart from each other. In other embodiments of the present disclosure, the layers 155a, 155b, and 155c may contact each other. In other embodiments of the present disclosure, some layers among 155a, 155b, and 155c contact each other while others are spaced apart from each other. The same situations apply to the metal layers 156a, 156b, and 156c.

Meanwhile, when the metal layers have a multilayer structure as described above, respective layers may be formed of the same metal material as each other. Alternatively, if necessary, the layers may be partially formed of a different material, or all the layers may be formed of different materials from each other.

Figure 13:
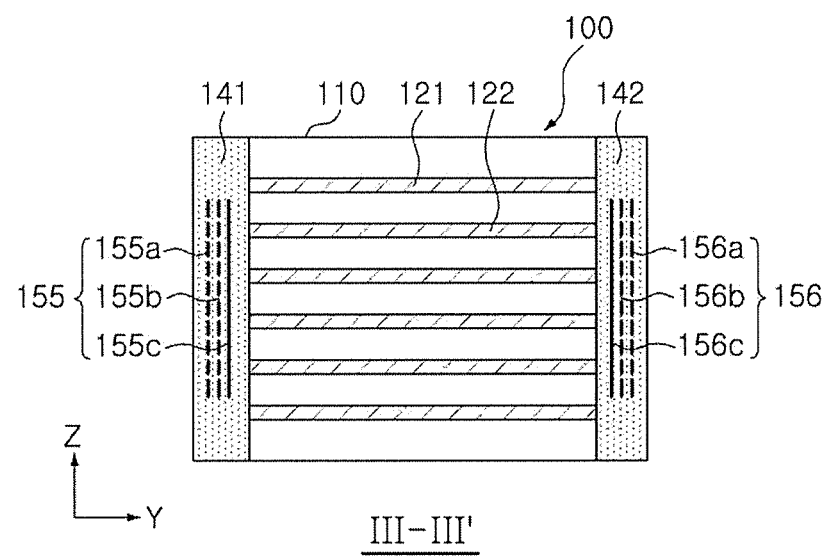

As illustrated in FIG. 13, a first metal layer 155 may include a plurality of metal plates, i.e. stripe-patterned metal layers 155a and 155b and plate-shaped metal layer 155c disposed to be spaced apart from each other in the Y direction corresponding to the thickness direction of the first side portion 141.

In addition, a second metal layer 156 may include a plurality of metal plates, i.e. stripe-patterned metal layers 156a and 156b and plate-shaped metal layer 156c disposed to be spaced apart from each other in the Y direction corresponding to the thickness direction of the second side portion 142.

Therefore, in a cross section of the body 110 in a Z-Y direction, each of the first and second metal layers 155 and 156 may have a multilayer structure in which the plurality of plate-shaped metal plates are stacked in the Y direction. When the metal layers have a multilayer structure as described above, infiltration of moisture may become more difficult, such that an effect of improving reliability of the multilayer capacitor may be further improved. In some embodiments of the present disclosure, the layers 155a, 155b, and 155c may be spaced apart from each other. In other embodiments of the present disclosure, the layers 155a, 155b, and 155c may contact each other. In other embodiments of the present disclosure, some layers among 155a, 155b, and 155c contact each other while others are spaced apart from each other. The same situations apply to the metal layers 156a, 156b, and 156c.

Meanwhile, when the metal layers have a multilayer structure as described above, respective layers may be formed of the same metal material as each other. Alternatively, if necessary, the layers may be partially formed of a different material, or all the layers may be formed of different materials from each other.

Figure 14:
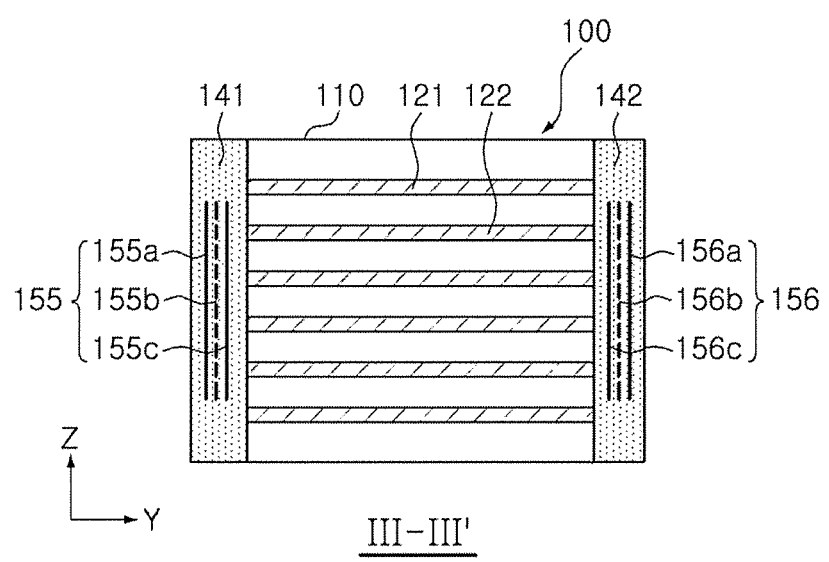

As illustrated in FIG. 14, a first metal layer 155 may include a plurality of metal plates, i.e. stripe-patterned metal layer 155b and plate-shaped metal layers 155a and 155c disposed to be spaced apart from each other in the Y direction corresponding to the thickness direction of the first side portion 141.

In addition, a second metal layer 156 may include a plurality of metal plates, i.e. stripe-patterned metal layers 156a and 156c and plate-shaped metal layer 156b disposed to be spaced apart from each other in the Y direction corresponding to the thickness direction of the second side portion 142.

In the embodiment, the number of plate-shaped layers and the number of stripe-patterned layers in the first side portion 141 are not the same as the second side portion. This shows a non-symmetrical arrangement of the metal layers in the first portion 141 with respect to the second side portion 142 for a purpose of engineering the desired moisture resistance properties of the multilayer capacitor 100.

Therefore, in a cross section of the body 110 in a Z-Y direction, each of the first and second metal layers 155 and 156 may have a multilayer structure in which the plurality of plate-shaped metal plates are stacked in the Y direction. When the metal layers have a multilayer structure as described above, infiltration of moisture may become more difficult, such that an effect of improving reliability of the multilayer capacitor may be further improved. In some embodiments of the present disclosure, the layers 155a, 155b, and 155c may be spaced apart from each other. In other embodiments of the present disclosure, the layers 155a, 155b, and 155c may contact each other. In other embodiments of the present disclosure, some layers among 155a, 155b, and 155c contact each other while others are spaced apart from each other. The same situations apply to the metal layers 156a, 156b, and 156c.

Meanwhile, when the metal layers have a multilayer structure as described above, respective layers may be formed of the same metal material as each other. Alternatively, if necessary, the layers may be partially formed of a different material, or all the layers may be formed of different materials from each other. Any other combinations of plate-shaped metal layers and stripe-patterned metal layers may be carried out in the first and second side portions 141 and 142 in the multilayer capacitor 100.

As set forth above, according to exemplary embodiments in the present disclosure, the metal layer may be formed in the side portion to block moisture infiltrated from the side portion itself corresponding to the margin portion and moisture infiltrated along the interfaces of the body and the external electrodes to allow the moisture not to reach the internal electrodes of the body, such that moisture resistance reliability of the multilayer capacitor may be improved.

While exemplary embodiments have been shown and described above, it will be apparent to those skilled in the art that modifications and variations could be made without departing from the scope of the present invention as defined by the appended claims.

What is claimed is:

1. A multilayer capacitor comprising:
   a body including: a plurality of dielectric layers, and a plurality of first and second internal electrodes alternately disposed with respect to dielectric layers interposed therebetween and having first and second surfaces opposing each other, third and fourth surfaces connected to the first and second surfaces and opposing each other, and fifth and sixth surfaces connected to the first and second surfaces and the third and fourth surfaces and opposing each other;

wherein the first internal electrode is exposed to the third, fifth, and sixth surfaces of the body;

the second internal electrode is exposed to the fourth, fifth, and sixth surfaces of the body;

first and second side portions disposed on the fifth and sixth surfaces of the body, respectively, and including first and second metal layers disposed therein; and first and second external electrodes disposed on the third and fourth surfaces of the body, respectively, and connected to the first and second internal electrodes, respectively.

2. The multilayer capacitor of claim 1, wherein the first and second metal layers are formed of one or more metals having oxygen or moisture affinity, selected from the group consisting of Ni, W, Cu, and metal compounds.

3. The multilayer capacitor of claim 1, wherein the first and second metal layers are formed of completely sintered densified layers.

4. The multilayer capacitor of claim 1, wherein the first and second metal layers are in a partly sintered state in which a necking phenomenonis generated and un-sintered powder particles are dispersed in the body.

5. The multilayer capacitor of claim 1, wherein the first and second metal layers are formed in a flat plate shape.

6. The multilayer capacitor of claim 1, wherein the first and second metal layers include a plurality of stripe type patterns spaced apart from each other in a stacking direction of the dielectric layers.

7. The multilayer capacitor of claim 1, wherein each of the first and second metal layers includes a plurality of metal plates spaced apart from each other in a thickness direction of the first and second side portions.

8. The multilayer capacitor of claim 1, wherein the first and second external electrodes respectively include first and second connection portions disposed on the third and fourth surfaces of the body, respectively, and connected to the first and second internal electrodes, respectively, and first and second band portions extended from the first and second connection portions to portions of the first and second surfaces of the body, respectively.

9. The multilayer capacitor of claim 1, wherein the first and second side portions are formed of a ceramic slurry.

10. The multilayer capacitor of claim 1, wherein a height of the first and second metal layers in a stacking direction of the dielectric layers is in a range of 90 to 98% of a height of the body.

11. The multilayer capacitor of claim 1, wherein a thickness of the first and second metal layers in a width direction of the dielectric layers is in a range of 0.3 to 3 µm.

12. A multilayer capacitor comprising:

first and second side portions;

a body between the first and second side portions, the body including dielectric layers and first and second internal electrodes alternately disposed with respective to dielectric layers interposed therebetween; and first and second external electrodes spaced apart from each other by the body and the first and second side portions, wherein each of the first and second side portions encloses a metal layer which is spaced apart from the body.

13. A multilayer capacitor comprising:

first and second side portions;

a body between the first and second side portions, the body including dielectric layers and first and second internal electrodes alternately disposed with respective to dielectric layers interposed therebetween; and first and second external electrodes spaced apart from each other by the body and the first and second side portions, wherein each of the first and second side portions encloses a plate-shaped metal layer and a strip-patterned metal layer.

14. The multilayer capacitor of claim 13, wherein the plate-shaped metal layer and the strip-patterned metal layer have the same thickness.

15. The multilayer capacitor of claim 13, wherein the plate-shaped metal layer and the strip-patterned metal layer have different thicknesses.

16. The multilayer capacitor of claim 13, wherein the strip-patterned metal layer includes a plurality of patterns spaced apart from each other along lengthwise directions of the first and second side portions.

17. The multilayer capacitor of claim 16, wherein the plurality of patterns are spaced apart from each other by the same distance.

18. The multilayer capacitor of claim 16, wherein the plurality of patterns are spaced apart from each other by different distances.

19. The multilayer capacitor of claim 16, wherein the plurality of patterns has the same thickness.

20. The multilayer capacitor of claim 16, wherein the plurality of patterns have different thicknesses.

* * * * *